United States Patent
Bruel (10) Patent No.: US 11,745,647 B2
(45) Date of Patent: Sep. 5, 2023

(54) METHOD FOR SENDING INFORMATION TO AN INDIVIDUAL LOCATED IN THE ENVIRONMENT OF A VEHICLE

(71) Applicant: ALSTOM Transport Technologies, Saint-Ouen-sur-Seine (FR)

(72) Inventor: Thomas Bruel, Miribel (FR)

(73) Assignee: ALSTOM Transport Technologies, Saint-Ouen-sur-Seine (FR)

(*) Notice: Subject to any disclaimer, the term of this patent is extended or adjusted under 35 U.S.C. 154(b) by 185 days.

(21) Appl. No.: 17/292,696

(22) PCT Filed: Nov. 8, 2019

(86) PCT No.: PCT/EP2019/080714
§ 371 (c)(1),
(2) Date: May 10, 2021

(87) PCT Pub. No.: WO2020/099270
PCT Pub. Date: May 22, 2020

(65) Prior Publication Data
US 2022/0009533 A1 Jan. 13, 2022

(30) Foreign Application Priority Data
Nov. 12, 2018 (FR) .................................. 1860419

(51) Int. Cl.
*G06V 20/58* (2022.01)
*B61L 13/00* (2006.01)
(Continued)

(52) U.S. Cl.
CPC .......... *B61L 13/00* (2013.01); *B61L 15/0072* (2013.01); *G06V 20/58* (2022.01); *G06V 40/161* (2022.01); *G06V 40/168* (2022.01); *G06V 40/18* (2022.01)

(58) Field of Classification Search
CPC ..... B61L 13/00; B61L 15/0072; G06V 20/58; G06V 40/161; G06V 40/168; G06V 40/18;
(Continued)

(56) References Cited

U.S. PATENT DOCUMENTS

| 2011/0234422 | A1* | 9/2011 | Yamashita | ............. B60Q 5/006 |
| | | | | 340/901 |
| 2012/0314071 | A1* | 12/2012 | Rosenbaum | .......... B60R 21/013 |
| | | | | 348/148 |

(Continued)

FOREIGN PATENT DOCUMENTS

| EP | 3358546 A1 | 8/2018 |
| WO | 2017/192852 A1 | 11/2017 |
| WO | 2018/008314 A1 | 1/2018 |

OTHER PUBLICATIONS

International Search Report for International Patent Application No. PCT/EP2019/080714, dated Jan. 30, 2020 in 5 pages.
(Continued)

*Primary Examiner* — Nimesh Patel
(74) *Attorney, Agent, or Firm* — Knobbe, Martens, Olson & Bear, LLP (57) ABSTRACT

The present invention relates to a method for sending information to an individual (11) located in the environment of a vehicle (10), the method comprising the following steps:
acquiring an image of the environment of the vehicle (10),
detecting, where applicable, at least one individual (11) on the acquired image,
determining a probability of collision between the individual (11) detected on the acquired image and the vehicle (10),
sending at least one item of information to the detected individual (11), the information sent depending on the determined probability of collision,
(Continued)

the steps of detecting, determining and sending being repeated, for the same individual (11), with subsequent acquired images as long as said individual (11) is detected on said images and as long as the probability of collision is greater than a threshold.

13 Claims, 6 Drawing Sheets

(51) Int. Cl.
*G06V 40/16* (2022.01)
*G06V 40/18* (2022.01)
*B61L 15/00* (2006.01)

(58) Field of Classification Search
CPC ...... G06V 20/56; G06V 10/82; G06V 40/103; G06V 10/50; G06V 10/764; G06V 20/44; G06V 20/54; G06V 20/582; G06V 20/588; G06V 40/20; B60Q 1/50; B60Q 1/503; B60Q 1/525; B60Q 9/00; B60Q 9/008; B60Q 1/14; B60Q 1/1423; B60Q 1/324; B60Q 2300/054; B60R 21/0134; B60R 1/00; B60R 21/013; B60R 21/01538; B60R 2300/106; B60R 2300/107; B60R 2300/301; B60R 2300/302; B60R 1/003; B60R 1/04; B60R 11/04; B60R 2300/105; B60R 2300/205; B60R 2300/8066; B60R 2300/8093; G06T 2207/20084; G06T 7/20; G06T 1/20; G06T 7/593; G06T 2207/10016; G06T 2207/30196; G06T 2207/30252; G06T 7/246; G06T 13/20; G06T 13/40; G06T 2207/10012; G06T 2207/30248; G06T 2207/30261; G06T 2207/30256; G06T 7/215; G06T 7/55; B60W 30/09; B60W 30/16; B60W 40/04; B60W 10/20; B60W 2050/146; B60T 2201/08; B60T 2210/32; B60T 2201/12; B60T 2201/024; B60T 2201/122; B60T 2201/10; B60T 2201/085

See application file for complete search history.

(56) References Cited

U.S. PATENT DOCUMENTS

| | | | |
|---|---|---|---|
| 2015/0329043 A1 | 11/2015 | Skvarce | |
| 2016/0325680 A1* | 11/2016 | Curtis | H04N 23/63 |
| 2017/0313247 A1* | 11/2017 | Hsu | G01S 17/89 |
| 2018/0144199 A1* | 5/2018 | Perez Barrera | G06V 10/56 |
| 2018/0173237 A1 | 6/2018 | Reiley et al. | |
| 2019/0025839 A1* | 1/2019 | Manjunath | G01S 11/12 |

OTHER PUBLICATIONS

French Search Report for French Patent Application No. FR 18 60419, dated Aug. 1, 2019 in 2 pages.

* cited by examiner

METHOD FOR SENDING INFORMATION TO AN INDIVIDUAL LOCATED IN THE ENVIRONMENT OF A VEHICLE

CROSS-REFERENCE TO RELATED APPLICATIONS

This application is the U.S. National Phase under 35. U.S.C. § 371 of International Application PCT/EP2019/080714, filed Nov. 8, 2019, which claims priority to French Patent Application No. 1860419, filed Nov. 12, 2018. The disclosures of the above-described applications are hereby incorporated by reference in their entirety.

FIELD OF THE INVENTION

The present invention relates to a method for sending information to at least one individual located in the environment of a vehicle. The present invention also relates to an associated vehicle.

BACKGROUND OF THE INVENTION

With the development of autonomous vehicles, that is, driverless vehicles, new issues relating to the safety of individuals are raised.

In particular, with such autonomous vehicles, a certain number of remote exchanges between the driver and the individual are no longer possible due to the absence of a driver. However, such exchanges are used to inform the driver of the individual's intentions and the individual of the driver's intentions, which limited risky situations, such as collisions. For example, when crossing a crosswalk, the individual is likely to wave to the driver to indicate that he or she is going to cross, and the driver usually waves back to the individual to indicate that he/she has taken into account that the individual is going to cross.

With autonomous vehicles, individuals do not know whether the autonomous vehicles have taken their movement into account. Individuals are then likely to feel less safe than in the presence of a conventional vehicle. Moreover, individuals may enter a roadway under the mistaken belief that the autonomous vehicle has taken them into account, generating a risky situation.

SUMMARY OF THE INVENTION

There is therefore a need for a method to improve the safety of individuals in the presence of a vehicle.

To this end, the object of the invention is a method for sending information to at least one individual located in the environment of a vehicle, the vehicle preferably being an autonomous vehicle, the method being implemented by an information sending system associated with the vehicle, the information sending system comprising an acquisition unit, a computer and an information sending unit, the method comprising, preferably at each moment, the following steps:
  acquiring at least one image of the environment of the vehicle, by the acquisition unit;
  detecting at least one individual on the acquired image, by the computer;
  determining a probability of collision between the individual detected on the acquired image and the vehicle, by the computer;
  sending at least one item of information in the direction of the individual detected on the acquired image, by the information sending unit, the sent item of information depending on the determined probability of collision;
  the steps of detecting, determining and sending being repeated, for the same individual, with subsequent acquired images as long as said individual is detected on said images and the probability of collision is greater than a threshold.

According to other advantageous aspects of the invention, the method for sending comprises one or more of the following features, considered alone or according to all technically possible combinations:
  the method comprises, where applicable, a step of identifying a face and/or a direction of gaze of the detected individual on the acquired image, by the computer, the item of information sent during the sending step being in the direction of the detected face and/or direction of gaze of the detected individual on the acquired image;
  the probability of collision is determined depending on the direction of gaze of the individual detected on the acquired image and advantageously from a distance calculated between the detected individual and the vehicle;
  the method comprises a step of memorizing facial features and/or direction of gaze of the individual detected on the acquired image, by the computer, when the facial features memorized for said image and facial features memorized for previous images correspond to the same individual, the probability of collision is determined depending on the acquired image and of said previous images, the previous images being consecutive images acquired immediately before said image,
  the probability of collision is determined depending on the position of the detected individual on the acquired image;
  the steps of detecting, determining and sending, as well as repeating said steps is conducted for a predetermined number of individuals detected on the acquired image;
  the item of information is visual information modeling the eyes and mouth of a virtual driver of the vehicle, the modeled eyes being oriented in the direction of gaze of the individual detected on the acquired image, the curvature of the modeled mouth depending on the determined probability of collision;
  the item of information is visual, auditory, vibratory, radio, olfactory and/or tactile information.

The invention further relates to a preferably autonomous vehicle configured to implement a method for sending as described above, the vehicle being associated with an information sending system comprising an acquisition unit, a computer and an information sending unit, said vehicle advantageously being a railway vehicle.

According to other advantageous aspects of the invention, the vehicle comprises the following feature:
  the information sending unit is located outside the vehicle.

BRIEF DESCRIPTION OF THE DRAWINGS

Further features and advantages of the invention will become apparent from the following description of embodiments of the invention, given by way of example only and with reference to the drawings, which are.

DETAILED DESCRIPTION OF THE PREFERRED EMBODIMENTS

Figure 1:
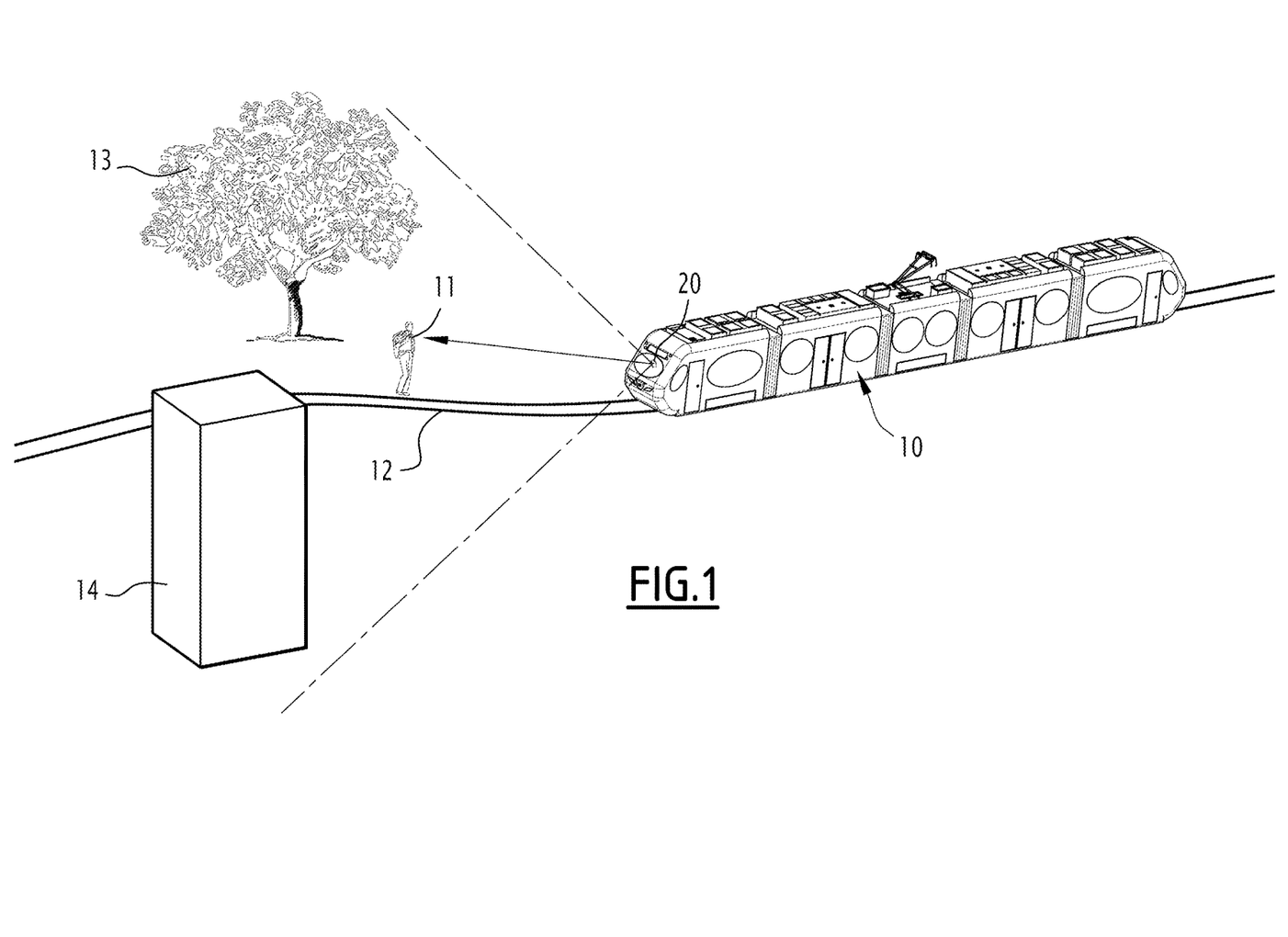
FIG. 1, a schematic representation of an example of a scene comprising a vehicle and an individual moving in the environment of said vehicle,
  FIG. 2, a schematic representation of an example of a vehicle according to the invention, FIG. 3, a flow chart of an examplary embodiment of a method for sending according to the invention, FIG. 4, a schematic representation of a situation in which positive visual information is sent in the direction of gaze of an individual in the environment of a vehicle and having a low probability of collision with the vehicle, FIG. 5, a schematic representation of a situation in which negative visual information is sent in the direction of view of an individual in the environment of a vehicle with a high probability of collision with the vehicle, and FIG. 6, a schematic representation of a set of visual information, each of which is directed to one of a set of individuals in a vehicle's environment.

A vehicle 10, preferably autonomous, and an individual 11 are illustrated in FIG. 1. The individual 11 is a pedestrian or a cyclist, for example.

The term "autonomous vehicle", also called autonomous guided vehicle, is understood as a vehicle capable of moving without the intervention of a driver, that is, a physical person. An autonomous vehicle is either a fully autonomous vehicle or a "semi-autonomous" vehicle, that is, one having various automated driving assistance systems.

The vehicle 10 is a rail vehicle such as a train, for example, or a streetcar. In a variant, the vehicle 10 is a bus, a car or a truck.

The environment of the vehicle 10 is the entire space outside the vehicle 10. The environment of the vehicle 10 varies, in particular, depending on the route taken by the vehicle 10 and the time at which such a route is taken. In the example illustrated in FIG. 1, the environment of the vehicle 10 comprises the individual 11, a roadway 12, a tree 13, and a building 14.

Figure 2:
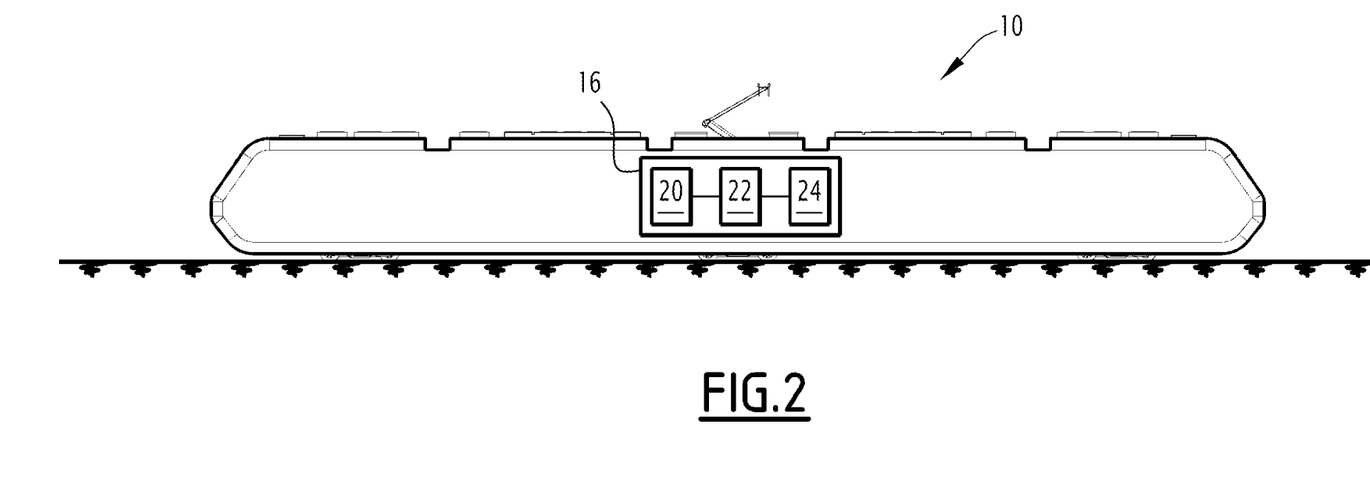

The vehicle 10 comprises an information sending system 16 comprising an acquisition unit 20, a computer 22, and an information sending unit 24.

The acquisition unit 20 is suitable for acquiring an image of at least a portion of the environment of the vehicle 10. For example, as illustrated in FIG. 1, the acquisition unit 20 is suitable for acquiring an image of the portion of the space in front of the vehicle 10. In a variant or additionally, the acquisition unit 20 is suitable for acquiring a portion of the space on the side or rear of the vehicle 10.

Preferably, the acquisition unit 20 is suitable for acquiring a 360° image of the environment of the vehicle 10.

Advantageously, the acquisition unit 20 is arranged outside the vehicle 10 to increase the field of view of said acquisition unit 20.

Alternatively, the acquisition unit 20 is arranged on a post along the roadway 12 to significantly increase the field of view of said acquisition unit 20.

The acquisition unit 20 comprises at least one high-definition sensor in at least two dimensions, such as an image sensor. For example, the sensor is a visible camera, an infrared camera, a RADAR, a LIDAR, a multi-channel microphone, a TeraHertz or X-ray sensor, or any other passive or active high-definition device. The sensor is configured to capture the faces of the individuals 11 in the environment of the vehicle 10, where applicable, when said faces are oriented in the direction of the acquisition unit 20.

The computer 22 is a separate computer, for example, or an FPGA microcontroller integrated into the Smart Camera type of acquisition unit 20. The computer 22 comprises, for example, a data processing unit, memories, an information carrier reader and a human-machine interface such as a keyboard or a display. In the example shown in FIG. 2, the computer 22 is integrated in the vehicle 10.

In a variant, the computer 22 is installed in an entity remote from the vehicle 10 and which communicates via non-wireless means with the acquisition unit 20 and the information sending unit 24. This allows for deploying the processing of the images acquired by the acquisition unit 20 outside the vehicle 10.

Advantageously, when the computer 22 is remote from the vehicle 10, the person skilled in the art will understand that the processing unit of the computer 22 is suitable for interacting with a computer program adapted to drive the implementation of a method for sending information to at least one individual 11 located in the environment of the vehicle 10. In this case, the computer program comprises a readable information carrier on which the computer program is stored.

The information sending unit 24 is configured to send information from the vehicle 10 to the individuals 11 located in the environment of the vehicle 10.

The information sending unit 24 is configured to send information in at least one of the following forms: visual, olfactory, tactile, vibratory, radio and/or auditory.

In the case of visual information, the information sending unit 24 comprises a screen on which the visual information is displayed, for example.

In a variant, the visual information can be projected on the ground, on a wall or any object forming part of the infrastructure that can be used to hold the information.

In the case of olfactory information, the information sending unit 24 for example comprises a scent diffuser.

In the case of non-contact tactile information, the information sending unit 24 comprises, for example, a unit for sending a stimulus, for example an electrical stimulus to the individual 11.

In the case of tactile information with contact, the information sending unit 24 comprises a robotic arm, a cylinder or an airbag, for example.

In the case of vibrational information, the information sending unit 24 comprises, for example, a vibration sending unit, for example a radio frequency vibration.

In the case of radio information, the information sending unit 24 comprises a radio wave transmitter, for example.

In the case of auditory information, the information sending unit 24 comprises a loudspeaker, for example, or any other method for reproducing a very low frequency or very high frequency sound or any eligible sound message.

In a variant, the information sending unit 24 comprises a combination of the above.

The information sending unit 24 may be arranged inside or outside of the vehicle 10 so as to facilitate communication with the individual(s) 11. For example, the information sending unit 24 is attached to the front hood and/or the rear trunk of the vehicle 10 or to the doors of the vehicle 10.

Advantageously, the information sending unit 24 can be integrated into the body materials of the vehicle, using electroluminescent materials.

Figure 3:
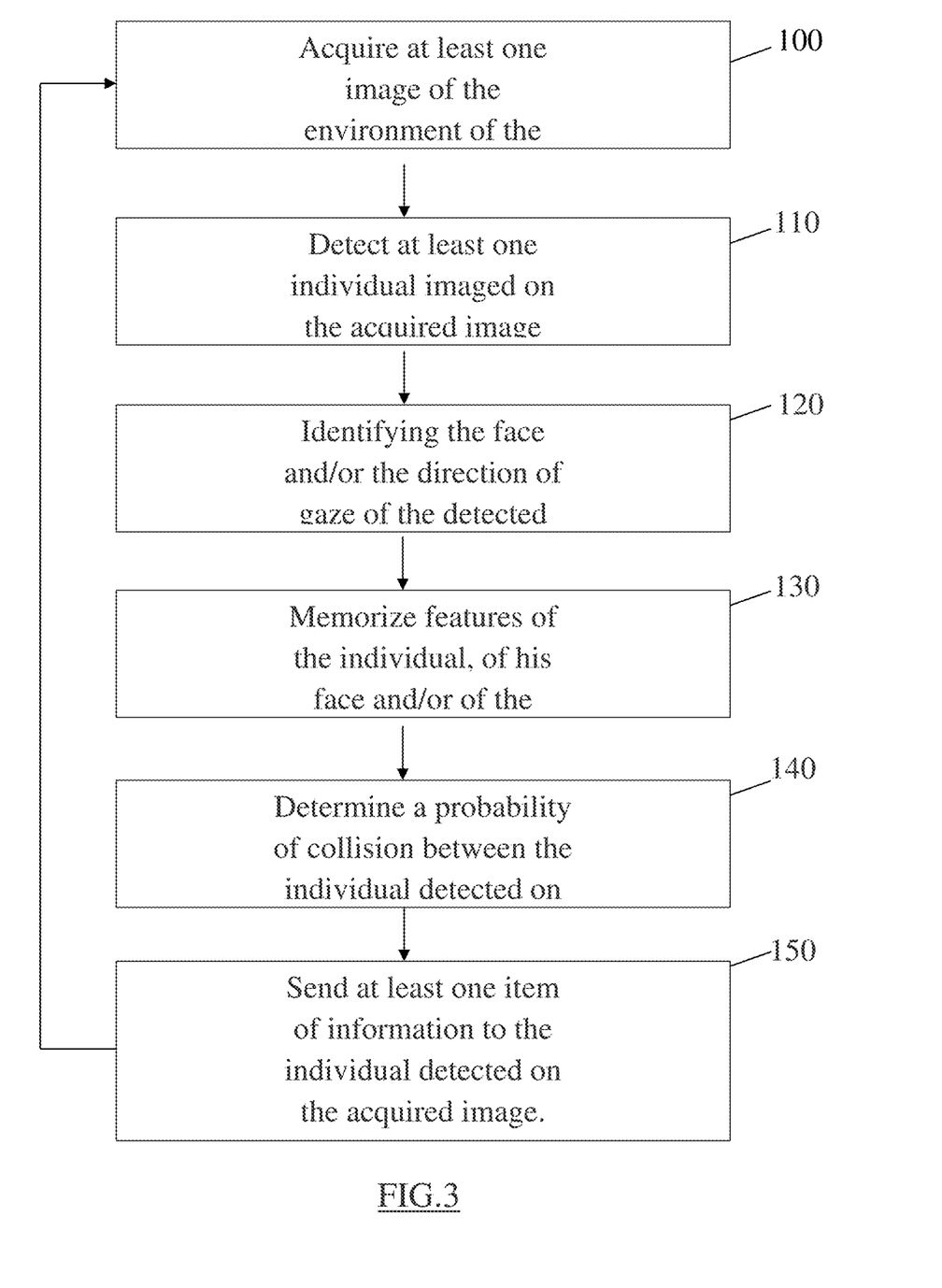

The operation of the vehicle 10 shall now be described with reference to FIG. 3, which illustrates an example of implementation of an information sending method according to the invention.

Advantageously, such an information sending method is implemented in real time, that is, at each moment the steps of the method are repeated.

The method for sending information comprises a step 100 of the acquisition unit 20 acquiring at least one image of the environment of the vehicle 10. The image acquired is an image covering a portion of the front space and/or the rear space of the vehicle 10, for example, and advantageously covering 360° of the space surrounding the vehicle 10.

The method for sending then comprises a step 110 the computer 22 detecting at least one individual 11 imaged on the acquired image, where applicable. The individual 11 is, detected by image processing of the convolutional neural network type, for example, or, in a variant, by deleting the background previously recorded in an on-board database.

The method then comprises an optional step 120 of the computer 22 identifying the face and/or the direction of gaze of the detected individual 11 on said acquired image.

The face of the individual 11 is identified by image processing of the convolutional neural network type, for example, possibly from a database of faces.

The gaze direction of the individual 11 on the image is determined by identifying the pupils of the individual 11, for example, which are in essence very contrasted with respect to the white of the eye and according to the inter-pupillary distance.

When the face and/or gaze direction of the individual 11 is not accessible in the acquired image, the face and/or gaze direction of the individual 11 is said to be "unidentified" and the following steps of the method are continued.

The individual 11 is followed image by image, for example, by identifying his morphology and the groups of colors composing him/her. This tracking makes it possible to preserve the knowledge acquired on each individual 11, image by image, and thus improve the reliability of the communication. This method aims at avoiding too many untimely communications with the individuals 11 who would be already tracked elsewhere.

In addition, when using the method on non-public sites, the method can comprise a database of the faces and features of authorized persons in order to facilitate their recognition.

Advantageously, when the individual 11 is part of a tight group such as a crowd, this information is memorized in order to increase the tracking risk level of the method.

The method then comprises an optional step 130 of memorizing, where applicable, by the memories of the computer 22, features of the individual 11, of his face and/or of the direction of gaze of the individual 11 for the acquired image.

The features of the face are, for example, the shape of the face (oval, round, square, triangular), the shape of the mouth or the distance between the pupils.

This memorization makes it possible to facilitate the identifying of the individual 11 on a later image, even if the individual 11 is temporarily masked by another person or a piece of furniture. Thus, the information relative to the individual 11 is preserved, which avoids carrying out additional calculations.

Preferably, the facial features and the direction of gaze of an individual 11 are stored in the computer 22 for a predetermined time, for example less than or equal to 5 minutes so as not to saturate the memory of the device.

The method also comprises a step 140 of the computer 22 determining a probability of collision between the individual 11 detected on the image and the vehicle 10.

The probability of collision is determined, for example, based on the current position and previous positions of the individual 11 detected on the acquired image. In this case, for example, the probability of collision is determined based on the calculation of the distance between the individual 11 and the vehicle 10 and, optionally, the orientation of the individual 11 relative to the vehicle 10.

Preferably, the probability of collision is also determined based on the gaze direction of the individual 11 detected on the acquired image. Indeed, when information relating to the direction of gaze of the individual 11 is accessible, this makes it possible to determine whether the individual 11 has seen the vehicle 10 or, on the contrary, whether he/she has not seen it. Thus, if the individual 11 has seen the vehicle 10, the probability of collision is caused to decrease, whereas if the individual 11 has not seen the vehicle 10, the probability of collision is caused to increase.

Advantageously, when the method comprises a memorization step 130 and when the facial features memorized for the current image and the facial features memorized for previous images correspond to the same individual 11, the probability of collision is determined depending on the acquired image and said previous images. The previous images are consecutive, acquired immediately before said image. Indeed, the information of the previous images allows in particular for determining the speed and/or acceleration of the individual 11 and, thus, to increase the accuracy of the determined probability of collision.

Advantageously, the method also comprises a step of memorizing the accessories associated with the individual 11. The accessories comprise a can, a bottle, a knife, headphones, a cell phone, a stroller, a wheelchair, a shopping cart, for example, or any other possible accessories. These accessories will modify the level of risk associated with the individual 11.

Advantageously, the method analyzes the movement of the individual 11 in order to determine his behavioral category according to criteria such as immobile, walking forward, walking backward, hesitant, threatening, aggressive or drunk.

The method then comprises a step 150 of sending at least one item of information to the individual 11 detected on the acquired image. The information sent depends on the determined probability of collision.

The information sent is so-called "positive" information, for example, when the determined probability of collision is low, that is, less than 5%. The information sent is "negative", for example, when the probability of collision is between 50% and 100%. The information sent is, for example, so-called "neutral" information when the probability of collision is less than 50%.

Preferably, the information is sent in the direction in which the individual 11 is looking. This increases the probability that the individual 11 understands that the information is intended for him/her.

Depending on the nature of the information sending unit 24, the information is visual, auditory, vibratory, radio, olfactory and/or tactile information.

When the information is visual information, the information models the eyes and mouth of a virtual driver of the vehicle 10, for example. The modeled eyes are preferably oriented in the direction of gaze of the individual 11 detected in the acquired image. The modeled mouth has a curvature that depends on the determined detection probability, for example. Thus, the modeled mouth has a smiling shape for positive information, for example, a neutral shape for neutral information, and a displeased shape for negative information. A color code can be used to reinforce the message. For example, a red color code for negative information, white or blue for neutral information, green for positive information.

Figure 4:
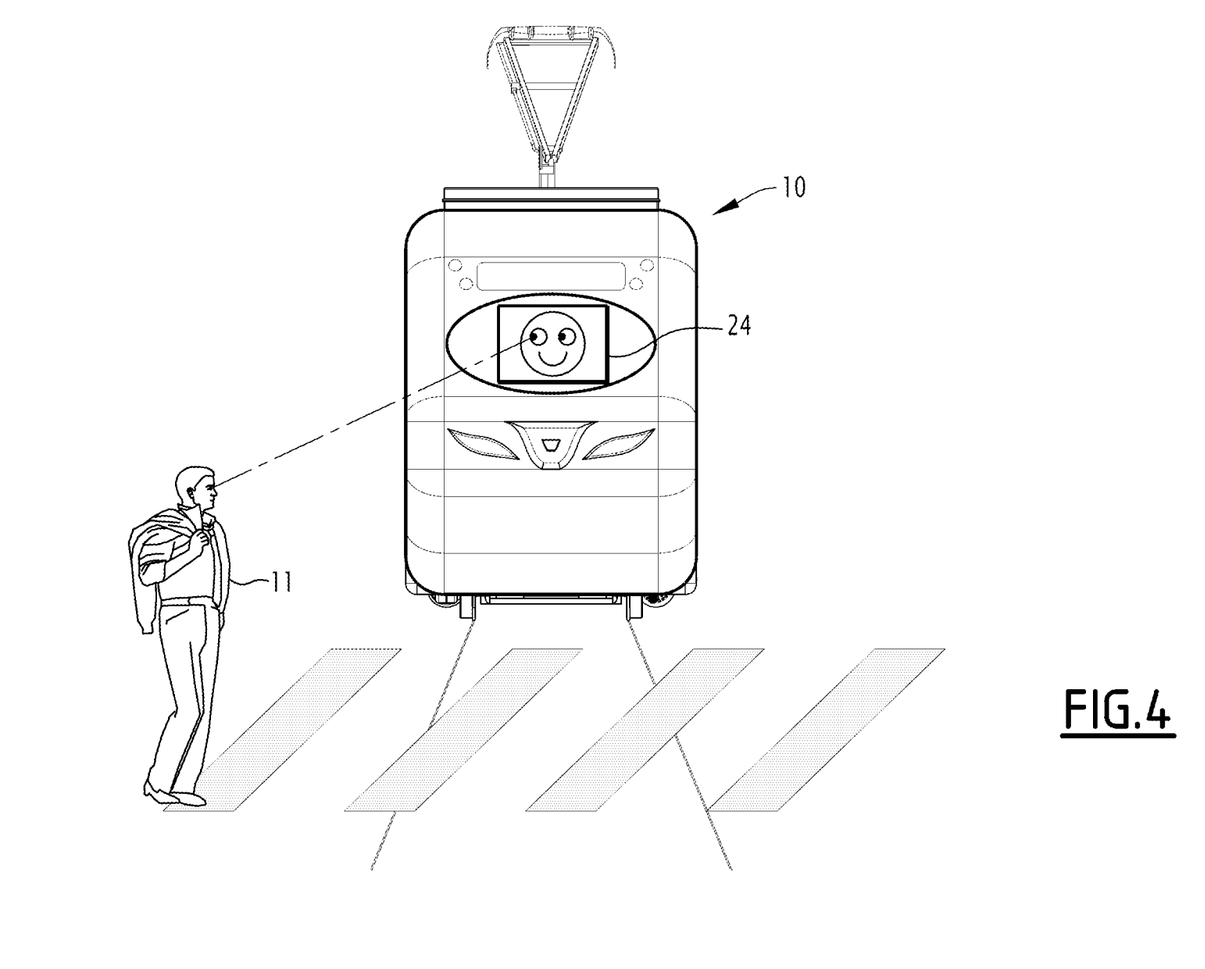

FIG. 4 illustrates an example of a situation in which an individual 11 crosses a crosswalk while having seen the vehicle 10, the vehicle 10 being stationary. In this situation, the probability of a collision is low, so the sending unit 24, which in this case is a screen, sends positive visual information to the individual 11 in the form of a smile and eyes oriented in the direction of the individual's gaze 11.

Figure 5:
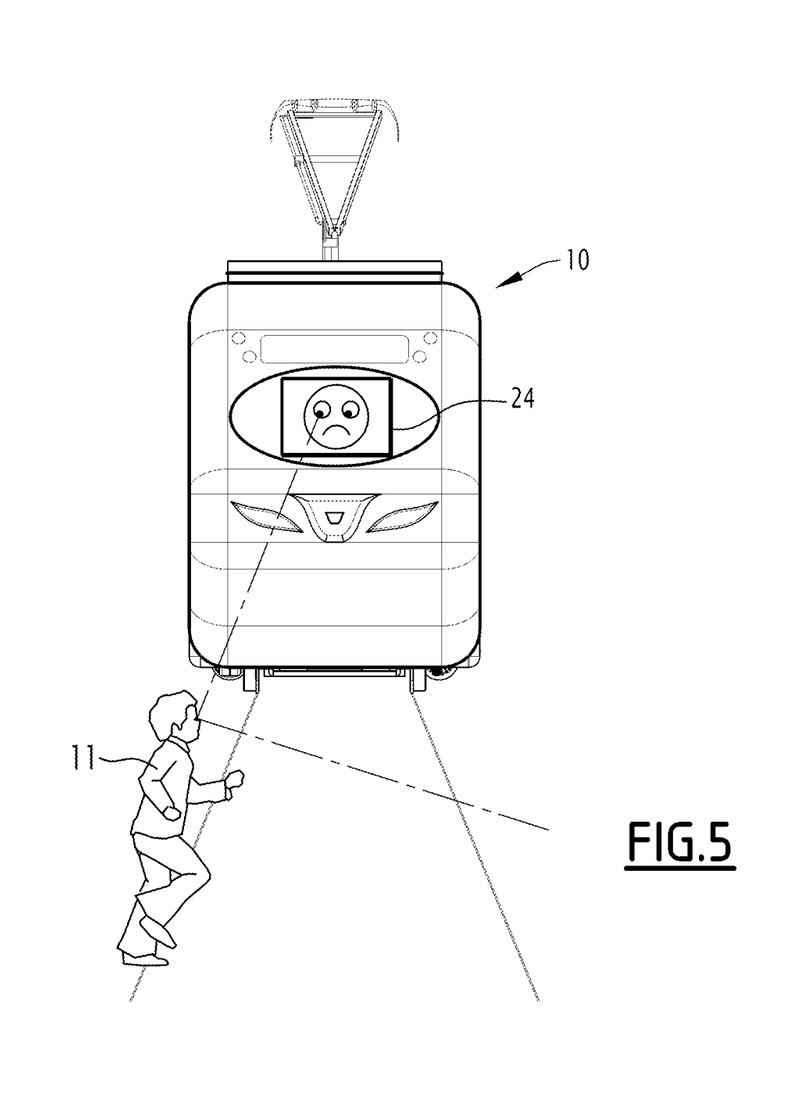

On the other hand, in the situation illustrated by FIG. 5, the individual 11 is about to run across a road on which a vehicle 10 is moving, without looking in the direction of the vehicle 10. The risk of collision is high. The sending unit 24 then sends negative visual information to the individual 11 in the form of a disgruntled face and eyes oriented in the direction of the individual 11.

The steps of detecting, identifying, memorizing, determining and sending are repeated for the same individual 11, with subsequent acquired images, as long as said individual 11 is detected in said images and the probability of collision is above a threshold. The threshold is predetermined, for example. The threshold is greater than or equal to 70%, for example. This makes it possible to monitor the evolution of a situation at risk for an individual 11.

The steps detecting, identifying, memorizing, determining and sending are advantageously repeated in parallel for a predetermined number of the individuals 11 detected on the acquired image. The predetermined number is greater than or equal to 3, for example.

When a large number of the individuals 11 is detected on the image, for example, a number of the individuals 11 greater than the predetermined number, the is individuals 11 for which said steps are going to be conducted are, for example, the is individuals 11 located at the smallest distance from the vehicle 10 with respect to the other individuals.

In this case, in order to send information to several the individuals 11, independently of each other, the vehicle 10 comprises several information sending subunits, for example, such as several screens or a screen divided into several portions in the case where the information to be sent is visual.

Figure 6:
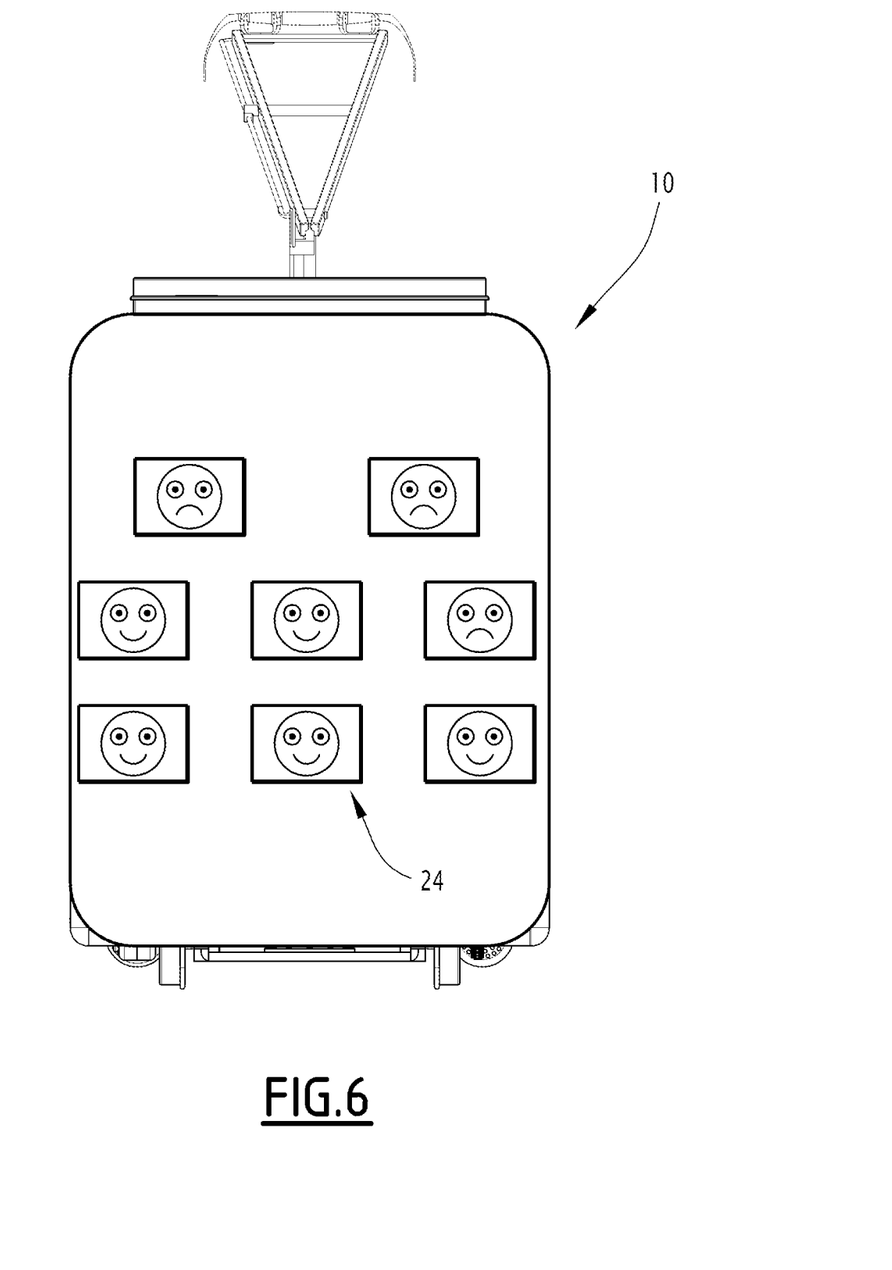

As illustrated in FIG. 6, the vehicle 10 can display eight pieces of information to eight different the individuals 11. The face at the top left, respectively right, is intended for the is individuals 11 located at a great distance from the vehicle 10 and to the left, respectively right, of the vehicle 10. The face in the middle left, respectively in the center, respectively on the right, is intended for the is individuals 11 located at an intermediate distance from the vehicle 10 and on the left, respectively in the center, respectively on the right, of the vehicle 10. The face at the bottom left, respectively in the center, respectively on the right, is intended for the is individuals 11 located at a small distance from the vehicle 10 and on the left, respectively in the center, respectively on the right, of the vehicle 10.

Thus, the method and the vehicle 10 according to the invention make it possible to reproduce exchanges of information that would take place between an individual 11 and a physical driver, even if the vehicle 10 is an autonomous vehicle not comprising a driver. The sending of information to the individual 11 makes it possible, on the one hand, to inform the individual 11 that the vehicle 10 is an autonomous vehicle, and on the other hand, to improve the feeling of safety of the individual 11 who is informed that the autonomous vehicle 10 has identified him/her.

Thus, such a method and device can improve the safety of individuals in the presence of a vehicle.

What is claimed is:

1. A method for sending information to at least one individual located in the environment of a vehicle, the method being implemented by an information sending system associated with the vehicle, the information sending system comprising an acquisition unit, a computer and an information sending unit, the method comprising steps:

acquiring at least one image of the environment of the vehicle, by the acquisition unit, detecting, where applicable, at least one individual on the acquired image, by the computer, determining a probability of collision between the individual detected on the acquired image and the vehicle, by the computer, sending at least one item of information in the direction of the individual detected on the acquired image, by the information sending unit, the information being sent depending on the determined probability of collision, wherein the steps of detecting, determining and sending are repeated, for the same individual, with subsequent acquired images, as long as said individual is detected on said images and the probability of collision is greater than a threshold, and wherein the steps of detecting, determining and sending, as well as repeating said steps are performed for a predetermined number of individuals detected on the acquired image.

2. The method according to claim 1, wherein the method comprises, where applicable, a step of identifying, by the computer, on the acquired image, a face and/or of a direction of gaze of the detected individual the item of information sent during the sending step being in the direction of the detected face and/or of the direction of gaze of the individual detected on the acquired image.

3. The method according to claim 2, wherein the probability of collision is determined depending on the gaze direction of the individual detected on the acquired image.

4. The method according to claim 3, wherein the probability of collision is in addition determined depending on a calculated distance between the detected individual and the vehicle.

5. The method according to claim 2, wherein the method comprises a step of memorizing, by the computer, features of the face and/or the gaze direction of the individual detected on the acquired image, when the features of the face memorized for said image and features of a face memorized for previous images correspond to the same individual, the probability of collision is determined depending on the acquired image and of said previous images, the previous images being consecutive images and acquired immediately before said image.

6. The method according to claim 1, wherein the probability of collision is determined depending on the position of the individual detected in the acquired image.

7. The method according to claim 2, wherein the item of information is visual information modeling the eyes and mouth of a virtual driver of the vehicle, the modeled eyes being oriented in the direction of gaze of the individual detected on the acquired image, the curvature of the modeled mouth depending on the determined probability of collision.

8. The method according to claim 1, wherein the item of information is visual, auditory, vibratory, radio, olfactory and/or tactile information.

9. A vehicle, configured to implement a method for sending according to claim 1, the vehicle being associated with an information sending system comprising an acquisition unit, a computer and an information sending unit.

10. The vehicle according to claim 9, wherein the information sending unit is located outside the vehicle.

11. The vehicle according to claim 9, wherein the vehicle is an autonomous vehicle.

12. The vehicle according to claim 9, wherein the vehicle is a rail vehicle.

13. The method according to claim 1, wherein at least the acquiring step, the detecting step, the determining step, and the sending step are performed at each moment.

* * * * *